L. H. Foy.
Shirt Supporter.
No. 2653. Reissued June 18 1867.
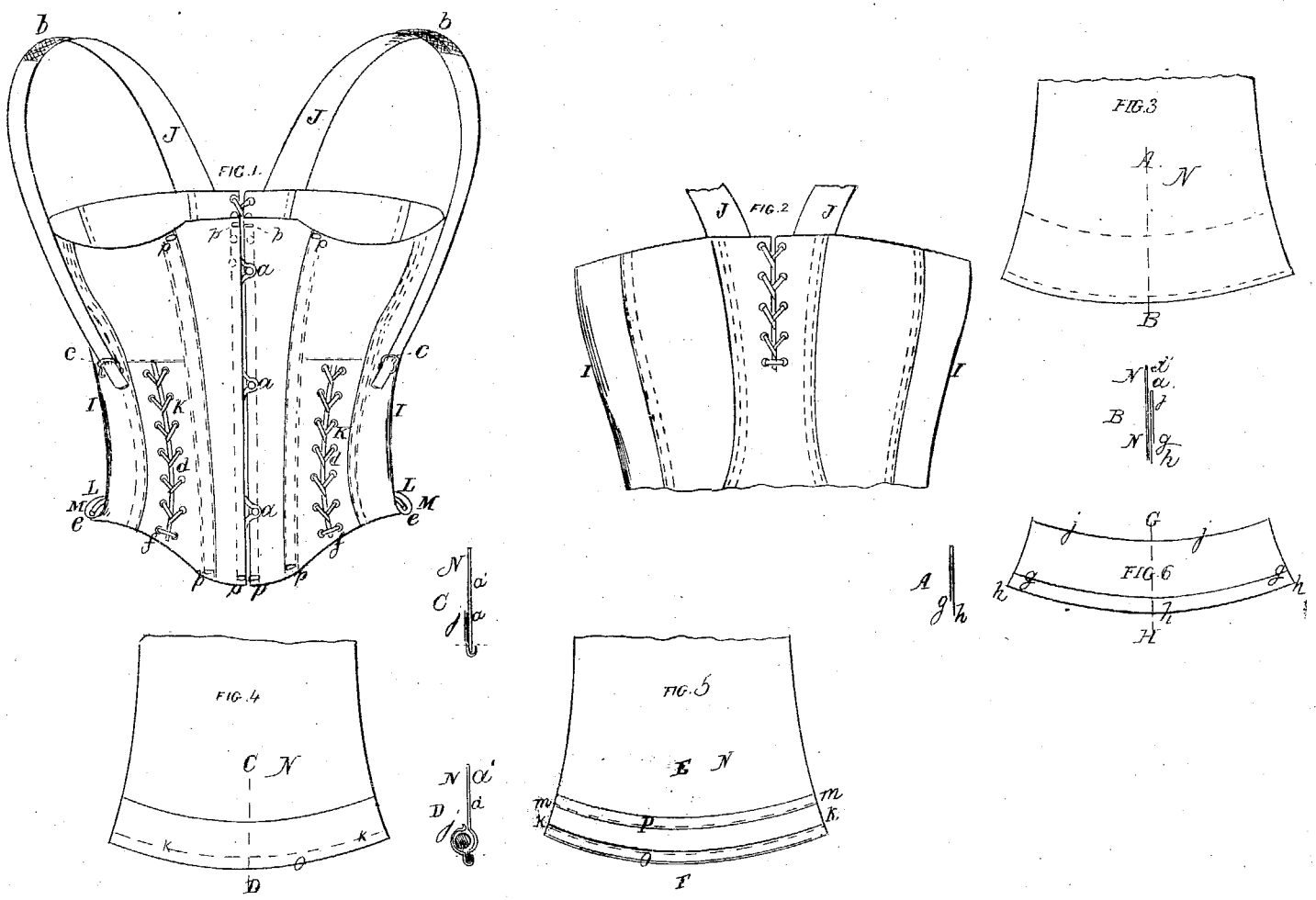
Witnesses { C. P. Ross
George Ames
Inventor Lorinda H. Foy

United States Patent Office.

JAMES H. FOY AND LAVINIA H. FOY, OF BOSTON, MASSACHUSETTS, ASSIGNEES BY MESNE ASSIGNMENTS OF LAVINIA H. FOY.

*Letters Patent No.* 39,911, *dated September* 15, 1853; *reissue No.* 2,653, *dated June* 18, 1867.

DIVISION 1.

IMPROVEMENT IN CORSET SKIRT-SUPPORTERS.

The Schedule referred to in these Letters Patent and making part of the same.

TO ALL WHOM IT MAY CONCERN:

Be it known that I, LAVINIA H. FOY, of Boston, in the county of Suffolk, and Commonwealth of Massachusetts, but formerly of the city and county of Worcester, in said Commonwealth, have invented certain new and useful improvements in Corset Skirt-Supporters, &c.; and I do hereby declare that the following is a full, clear, and exact description of the same, reference being had to the accompanying drawings forming a part of this specification, and in which—

Figure 1 represents a front view of my improved corset skirt-supporter.

Figure 2 represents a back view of the upper part or section thereof; while

Figures 3, 4, 5, and 6, and sections A, B, C, and D represent detached parts, and are designed more particularly to illustrate the forms of the bottoms of the pieces which form the extension rim or supporter, and the particular mode of binding the same, as will be more fully described hereafter.

In fig. 1, I represents the body of the article, which is fastened in front by the metal clasps *a a a*, in the usual and well-known mode of fastening corsets in which steel springs are used. J J are the shoulder-straps, provided with elastics *b b*, their front ends being retained by the buckles *c c*, attached to the front of the body I, (see fig. 1.) The back of the body I is left open and laced up, as fully shown in figs. 1 and 2, whereby the upper part of the body I can be adjusted and the shoulder-straps thrown further off of the shoulders whenever desired. The front of the body I is left open, as seen at K K, and provided with lacings *d d*, whereby the size of the central part of the body I can be very quickly adjusted and varied in size, and that, too, without in the least impairing the form or action of the skirt-supporting rim L, since the openings K K are both in front of the points *e e* of the extensor L. If preferred, the openings K K could extend quite through the bottom of body I, instead of being closed, as seen at *f f*. The extensor or supporting rim L is formed from the lower parts or bottoms of the pieces which go to make up the back of the body I, the general form of which is shown in the drawings, fig. 3, 4, and 5. When these pieces are sewed together, and the hoop M inserted, the extensor or rim L is produced. The rim or extensor L is bound in a novel and peculiar manner, whereby the outer edge thereof has a corded appearance, while the binding piece is made to answer as a case to receive and retain the hoop M. Strips of cloth of sufficient length and width to bind with are cut bias, and then one edge *g* is folded over, as seen in fig. 6, when the single edge *h* is stretched so as to give the proper curved form as indicated in the same figure. The binding piece is then placed with its single edge *h* next to the lining *i* of the face-cloth N, as indicated in section line B, which is designed to represent line A B, fig. 3, when the parts are placed together for stitching. After the edges *h*, *i*, and N are stitched together, the loop part *j* is turned over upon the other side of the face-cloth N, so as to bring the edge *g* in close proximity to the edges *h*, *i*, and N, when all of the thicknesses are stitched together, just back of the first stitching, whereby the edges *h*, *i*, N, and *g* are all turned in and brought together outside of the seam K, figs. 4 and 5, thereby giving the article the appearance of corded work, as seen at O, same figure. All that remains is to stitch another seam at *m*, when the hoop M can be inserted, the article having the finished appearance indicated in fig. 5. In the sections B C D of the lines A B, C D, and E F, the relative positions of the different thicknesses of cloth are represented in a loose and expanded condition with a view to illustrate more fully the mode of operation or binding. When, however, the stitching is performed, the parts are all drawn closely together, and assume a compact and neat appearance, the edges O and P assuming rounded forms.

It will be observed that by folding the edge *g* as shown, that too much bulk and thickness are avoided in the outer seams and edge, and a neater piece of work produced than if the edge *g* folded down even with the edge *h*; besides the curved form is more readily produced by stretching a single edge, as shown. If preferred, one or both of the openings K could be extended from top to bottom. *p p p p* are metal caps, placed over the ends of the springs and whalebones.

Having described my improved corset skirt-supporter, what I claim therein as new, and desire to secure by Letters Patent, is—

1. The binding cloth, cut bias as described, in combination with the exterior or outer edge of the rim L, to which the binding cloth is applied as specified, whereby all gathering is avoided, while a corded appearance and a case for the hoop M are produced, substantially as set forth.

2. The combination of laced openings K K, or either of them, with the front part of the body I of a corset, open in front, substantially as set forth.

3. The body I, open in front, and adjustable both in front and in the back, by means of laced openings, substantially as shown and described.

4. Forming the curve for the hoop and corded edges O and P from the same piece of bias-cut cloth, as shown and described.

LAVINIA H. FOY.

Witnesses:
C. G. LANE,
GEORGE AMES.